Patented June 10, 1924.

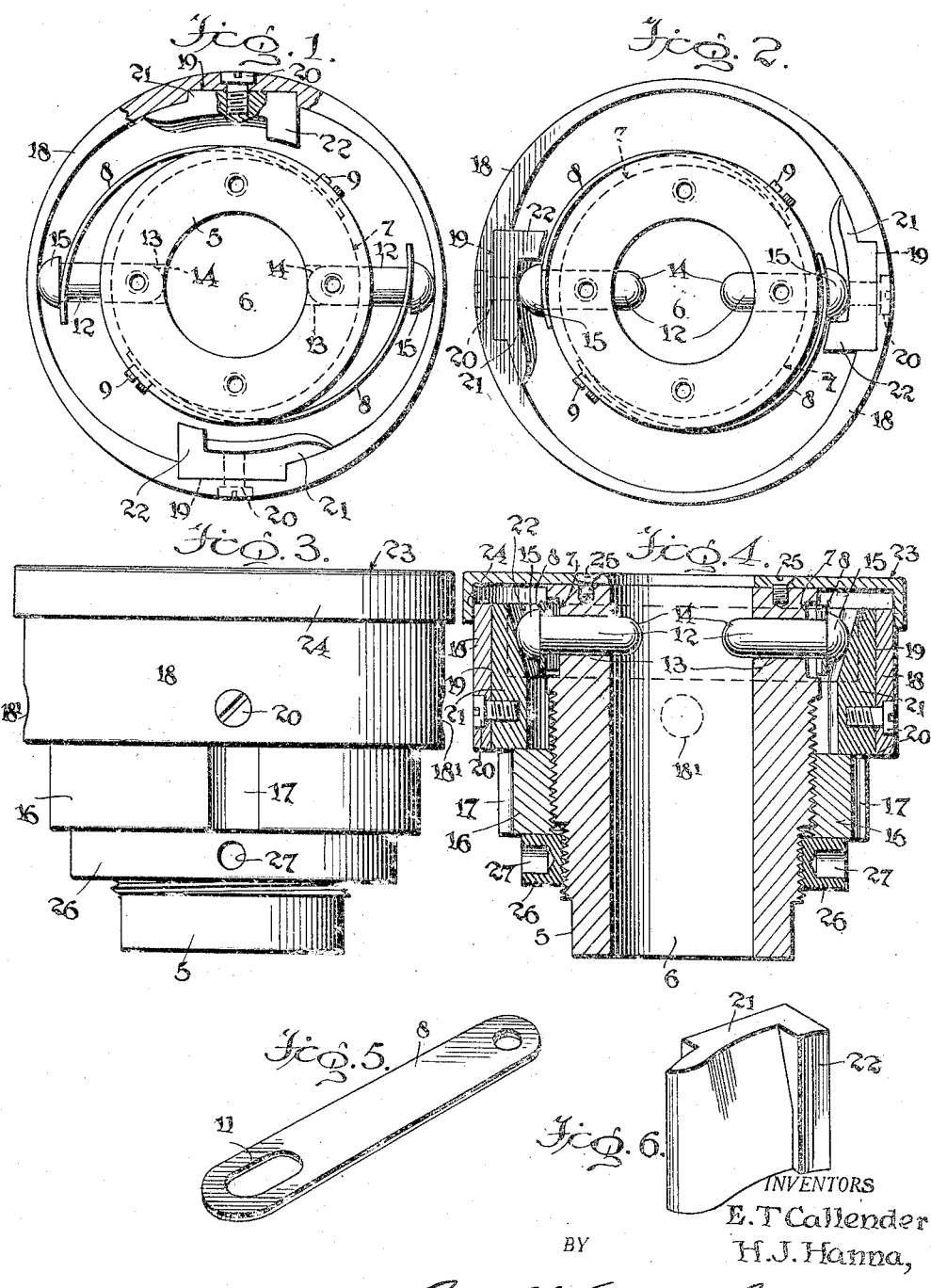

1,497,483

UNITED STATES PATENT OFFICE.

EDWARD T. CALLENDER AND HERMAN J. HANNA, OF OAKFIELD, NEW YORK.

DRILL CHUCK.

Application filed July 21, 1921. Serial No. 486,570.

*To all whom it may concern:*

Be it known that we, EDWARD T. CALLENDER and HERMAN J. HANNA, citizens of the United States, residing at Oakfield, in the county of Genesee and State of New York, have invented certain new and useful Improvements in Drill Chucks, of which the following is a specification.

This invention relates to drill chucks, more particularly to devices of this character employed for holding the twist drills used in mining operations, and has for one of its objects—to improve the construction and increase the efficiency and utility of devices of this character.

Another object of the invention is to provide a device of this character including a plurality of laterally movable pins arranged to be adjusted by a sleeve or cam collar, movable rotatively and longitudinally of the chuck body.

Another object of the invention is to provide a device of this character which may be readily adjusted to hold drills or like devices of various sizes.

With these and other objects in view the invention consists in certain novel features of construction as hereinafter shown and described and then specifically pointed out in the claims, and in the drawings illustrative of the preferred embodiment of the invention.

The invention will be best understood from a consideration of the following detailed description taken in connection with the accompanying drawings forming a part of this specification, with the understanding however that the invention is not confined to any strict conformity with the showing of the drawings, but may be changed and modified so long as such changes and modifications mark no material departure from the salient features of the invention as expressed in the subject matter being claimed.

In the accompanying drawings:

Fig. 1 is a plan view partly in section and without the cover member, and the clamping pins in their outer or inoperative position.

Fig. 2 is a similar view with the clamping pins at their greatest inward or drill stock engaging position.

Fig. 3 is a side elevation.

Fig. 4 is a vertical sectional elevation.

Fig. 5 is a detached perspective view of the clamp pin operating leaf spring.

Fig. 6 is a detached perspective view of one of the double faced wedge blocks.

In the drawings, wherein like numerals designate corresponding parts throughout the several views, 5 designates the chuck body which is provided with a central bore 6 for receiving the usual drill to be held thereby.

The chuck body has an annular recess 7 near the top in which a pair of flat springs 8 are positioned and secured by diametrically opposite fastening elements 9, so that the free ends of the springs are free to be moved in and out of the recess 7. The springs are each provided with an elliptical slot 11 near the free ends as shown in Fig. 5 for the reception of a pair of locking pins 12, the same extending through diametrically opposed recesses 13 of the chuck body and into the bore 6 so that the inner rounded or cup shaped ends 14 of the pins may engage the stock of the drill, not shown. The pins 12 are each provided with an enlarged head 15 to prevent them from passing through the elliptical slots 11 of the springs 8 and therefore lie outside the chuck body, when in engaged position as shown by Figs. 2 and 4.

The chuck body except the portion occupied by the recess 7 is externally threaded for receiving an internally threaded clamping collar 16 provided with opposed recesses 17 to be engaged by a spanner wrench or similar tool to rotate the collar.

Mounted for rotation on the chuck body next to the clamping collar 16, is a cam collar 18 having an elliptical interior and a preferably circular exterior, said collar having recesses or seats 19 in the thicker portions of its walls at diametrically opposite points. Rigidly secured in said seats as by clamp screws 20, are cam blocks 21.

Each cam block is formed with its inner face inclined both circumferentially of the cam collar and longitudinally of the axial line of the chuck body and each provided with a stop shoulder 22 at the thicker end.

The enlarged rounded outer ends of the pins 12 are yieldably held by the resilient member 8 in constant engagement with the inner faces of the cam collar 18, and will thus engage the faces of the longer axis of the ellipse when in one position and withdraw the inner ends of the pins 12 entirely within the body of the chuck, as shown in Fig. 1. Then by forcibly rotating the cam collar, as by a spanner wrench engaging in sockets indicated at 18′ in the outer face of said collar, the inner cam face of the collar will force the pins inwardly against the resistance of the springs 8, and as the blocks 21 reach the heads 15 of the pins, the circumferentially inclined faces of the blocks will still further move the pins inwardly, to cause them to engage a relatively small drill stock. When the collar is rotated far enough to engage the blocks 21 with the pins 12, the clamp collar 16 will be forcibly rotated by a spanner wrench or like implement, to move the cam collar longitudinally of the stock to cause the longitudinally directed inclined faces of the blocks 21 to move the blocks still further inwardly and correspondingly increase the "throw" of the pins.

The pins 12 may thus be caused to move for a considerable distance, to adapt the device to a relatively wide range of sizes of drills or other implements, as will be obvious.

A cover plate or cap 23 having an annular flange 24 is secured by a plurality of fastening elements 25 to the top of the chuck body to overlie the top edge of the cam collar to prevent the admission of dirt or foreign matter to the cam blocks and the pins 12.

A locking collar 26 is threaded on the chuck body and provided with spanner wrench sockets 27, to lock the collar 16 and cam collar 18 in position.

In the accompanying drawings, we have illustrated our invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having thus described the invention, what is claimed as new is:—

1. A drill chuck comprising a tubular stock, a cam collar rotative relatively to said stock and having an elliptical interior face, cam blocks attached to said cam collar at diametrically opposite sides thereof and having faces inclined both circumferentially and longitudinally of the stock, pins engaging through the stock and with their outer ends engaging against the inner faces of the cam collar and radially movable by said cam blocks into clamping position when the cam collar is rotated, and means for forcibly moving the cam collar longitudinally of the stock to further advance said pins.

2. A drill chuck comprising a tubular stock, a cam collar rotative relatively to said stock and having an elliptical interior face, means for moving the cam collar longitudinally of the stock, cam blocks attached to said cam collar at diametrically opposite sides thereof and having faces inclined both circumferentially and longitudinally of the stock, pins engaging through the stock and with their outer ends engaging against the inner faces of the cam collar and radially movable by said cam blocks into clamping position when the cam collar is rotated, and resilient means for supporting said pins, and causing them to be withdrawn from the interior of the stock.

3. A drill chuck comprising a tubular stock externally threaded, a cam collar rotative relatively to said stock and having an elliptical interior face, cam blocks attached to said cam collar at diametrically opposite sides thereof and having faces inclined both circumferentially and longitudinally of the stock, pins engaging through the stock and with their outer ends engaging against the inner faces of the cam collar and radially movable by said cam blocks into clamping position when the cam collar is rotated, and a threaded collar engaging the threads of the stock and operating to move the cam collar longitudinally of the stock to further advance said pins.

In testimony whereof, we affix our signatures.

EDWARD T. CALLENDER.
HERMAN J. HANNA.